US007597436B2

(12) United States Patent
Momose et al.

(10) Patent No.: US 7,597,436 B2

(45) Date of Patent: Oct. 6, 2009

(54) MAINTENANCE LIQUID FOR INK JET RECORDING APPARATUS

(75) Inventors: Masayuki Momose, Nagano-Ken (JP); Miharu Kanaya, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 19 days.

(21) Appl. No.: 10/870,325

(22) Filed: Jun. 17, 2004

(65) Prior Publication Data

US 2005/0018023 A1 Jan. 27, 2005

(30) Foreign Application Priority Data

Jun. 18, 2003 (JP) ............................ 2003-173346

(51) Int. Cl.
*G01D 11/00* (2006.01)

(52) U.S. Cl. ........................... 347/95; 347/100; 347/28

(58) Field of Classification Search ................. 347/100, 347/95, 96, 97, 101, 35, 28, 22, 29; 523/160; 106/31.6, 31.13, 31.27
See application file for complete search history.

(56) References Cited

U.S. PATENT DOCUMENTS 4,612,135 A * 9/1986 Wenzel ........................ 510/423
5,746,818 A * 5/1998 Yatake ........................ 347/100
5,825,380 A * 10/1998 Ichizawa et al. .............. 347/95
6,017,872 A * 1/2000 Pedersen et al. ............ 510/424
2002/0126174 A1* 9/2002 Sharma et al. ................ 347/28

FOREIGN PATENT DOCUMENTS

| | | |
|---|---|---|
| JP | 62-169876 | 7/1987 |
| JP | 62-169877 | 7/1987 |
| JP | 04-261476 | 9/1992 |
| JP | 2000-109733 | 4/2000 |
| JP | 2000-328093 | 11/2000 |

OTHER PUBLICATIONS

Patent Abstracts of Japan and English Computer Generated Translation of JP 2000-328093 dated Nov. 28, 2000.
Patent Abstracts of Japan and English Computer Generated Translation of JP 2000-109733 dated Apr. 18, 2000.
Patent Abstracts of Japan of JP 04-261476 dated Sep. 17, 1992.
Patent Abstracts of Japan of JP 62-169876 dated Jul. 27, 1987.
Patent Abstracts of Japan of JP 62-169877 dated Jul. 1987.

* cited by examiner

*Primary Examiner*—Manish S Shah
(74) *Attorney, Agent, or Firm*—Ladas & Parry LLP

(57) ABSTRACT

Disclosed is a maintenance liquid for an ink jet recording apparatus which possesses excellent cleaning properties. In particular, a maintenance liquid, which exhibits excellent cleaning properties even in an ink jet printer using an ink having a high colorant density and containing a pigment, and a maintenance liquid for an ink jet recording apparatus, which does not attack members for a printer and possesses excellent antifoaming properties and preservative/antimold effect, are disclosed. The maintenance liquid for an ink jet recording apparatus according to the present invention comprises water and an alkylene glycol monoalkyl ether.

13 Claims, No Drawings

MAINTENANCE LIQUID FOR INK JET RECORDING APPARATUS

BACKGROUND OF THE INVENTION

1. Field of the Invention

The present invention relates to a maintenance liquid for use in an ink jet recording apparatus.

2. Background Art

Ink jet printers have been commercialized as noiseless, high-speed, and high-resolution non-impact printers. Inks used in ink jet recording are mainly water-base inks using water and water-soluble organic solvents from the viewpoints of odor, safety and the like. Water-soluble dyes have hitherto been utilized as colorants for inks for use in ink jet recording. In recent years, from the viewpoint of improving print quality, there is a tendency toward an increase in the content of dye in the ink. Further, the use of pigments instead of water-soluble dyes is recently being expanded from the viewpoint of improving print quality and fastness properties of images.

In ink jet recording, ink is ejected through nozzles having a very small diameter of about 20 to 50 μm. Therefore, thickening and precipitation in the ink are likely to occur in a portion around the front end of nozzles due to evaporation of a low-boiling solvent, colorant separation and coagulation and the like. These unfavorable phenomena sometimes lead to troubles such as print disorder and nozzle clogging. They are likely to take place after a halt of the apparatus for a long period of time.

Methods which have been proposed for preventing these problems include (1) a method in which, upon the occurrence of troubles, the ink passage is cleaned with a cleaning liquid, and (2) a method in which, when a halt of the apparatus for a long period of time is expected, the ink is previously replaced by a maintenance liquid. In both the above methods, the attained effect depends greatly upon cleaning properties of the cleaning liquid or the maintenance liquid used.

Examples of cleaning liquids or maintenance liquids include a maintenance liquid comprising a polyhydric alcohol, a monohydric alcohol, and water (for example, Japanese Patent Publication No. 8437/1994), a maintenance liquid comprising a monohydric alcohol, an anionic surfactant, and water (for example, Japanese Patent Publication No. 30200/1996), an isothiazolone compound-containing cleaning liquid having improved antimold/antimicrobial effect (for example, Japanese Patent Laid-Open No. 261476/1992), a silicone antifoaming agent-containing cleaning liquid having improved antifoaming properties (for example, Japanese Patent Laid-Open No. 328093/2000), and a maintenance liquid having pH 8 to 11 applicable in the case where a particular crosslinkable ink is used (for example, Japanese Patent Laid-Open No. 109733/2000).

However, there is still a need for a maintenance liquid having better cleaning properties. In particular, it can be said that the above-described recent tendency toward an increase in colorant content of ink and expansion of use of pigments has led to a demand for a maintenance liquid having better cleaning properties.

SUMMARY OF THE INVENTION

The present inventors have now found that a good maintenance liquid for an ink jet recording apparatus can be provided by adding an alkylene glycol monoalkyl ether. The present invention has been made based on such finding.

Accordingly, an object of the present invention is to provide an excellent maintenance liquid for an ink jet recording apparatus. In particular, an object of the present invention is to provide a maintenance liquid, which exhibits excellent cleaning properties even in an ink jet printer using an ink having a high colorant density or an ink containing a pigment, and a maintenance liquid for an ink jet recording apparatus, which does not attack members for a printer and possesses excellent antifoaming properties and preservative/antimold effect.

The maintenance liquid for an ink jet recording apparatus according to the present invention comprises water and an alkylene glycol monoalkyl ether.

DETAILED DESCRIPTION OF THE INVENTION

The maintenance liquid for an ink jet recording apparatus according to the present invention comprises at least water and an alkylene glycol monoalkyl ether. This maintenance liquid is used for an ink jet recording apparatus. Specifically, when an ink jet recording apparatus is halted for a long period of time, or when the ink passage and recording head of the ink jet recording apparatus are cleaned periodically for clogging prevention purposes, the maintenance liquid is supplied instead of the ink to the ink jet recording apparatus. Preferably, cleaning is carried out by closing the cap of the recording head and, in this state, sucking the maintenance liquid.

The maintenance liquid according to the present invention has good cleaning properties. After cleaning using the maintenance liquid or filling of the maintenance liquid, troubles such as unstable ink ejection and nozzle clogging can be effectively prevented. The reason why the maintenance liquid according to the present invention can effectively suppress the above troubles has not been elucidated yet. However, without intending to be bound by theory, the reason for the advantageous prevention of the above troubles by the maintenance liquid according to the present invention is believed to be as follows. Since materials generally used for the internal surface of the ink passage such as SUS are well wetted by the maintenance liquid comprising an alkylene glycol monoalkyl ether, the ink composition or its ingredients can be efficiently replaced by the maintenance liquid. It is also considered that the maintenance liquid according to the present invention is highly miscible with a coloring material or other ingredients in the ink composition and, thus, the above ingredients can be efficiently discharged in maintenance liquid discharge operation.

Further, according to the present invention, the reactivity of the alkylene glycol monoalkyl ether with each member used in the ink jet printer is low, and, thus, advantageously, the member is not attacked by the maintenance liquid after cleaning or filling for a long period of time.

The content of the alkylene glycol monoalkyl ether in the maintenance liquid according to the present invention may be properly determined so as to fall within such a content range that can realize the above effect. The content of the alkylene glycol monoalkyl ether, however, is preferably in the range of 0.3 to 15% by weight. The lower limit of the alkylene glycol monoalkyl ether content is more preferably 0.5% by weight, and the upper limit of the alkylene glycol monoalkyl ether content is more preferably 10% by weight. The alkylene glycol monoalkyl ether content in the above-defined range gives the above effect satisfactorily. Further, in this case, the viscosity of the maintenance liquid can be brought to a proper range, and, thus, good fluidity can be ensured in the maintenance liquid. When a certain kind of coloring material is contained in the ink composition, the presence of an excessive amount of alkylene glycol monoalkyl ether sometimes causes a thickening phenomenon. Therefore, in some cases, specifying the content of the alkylene glycol monoalkyl ether is preferred depending upon the kind of the coloring material contained in the ink composition.

In a preferred embodiment of the present invention, the alkylene glycol part of the alkylene glycol monoalkyl ether is preferably di(or tri)ethylene (or propylene) glycol. On the other hand, the alkyl group which, together with the alkylene glycol part, forms the alkyl ether is preferably straight-chain or branched-chain $C_{1-6}$ alkyl, more preferably $C_{1-4}$ alkyl. Specific examples of preferred alkylene glycol monoalkyl ethers include diethylene glycol mono-n-butyl ether, triethylene glycol mono-n-butyl ether, dipropylene glycol mono-n-butyl ether, diethylene glycol mono-tert-butyl ether, triethylene glycol mono-tert-butyl ether, and triethylene glycol monomethyl ether. A single alkylene glycol monoalkyl ether may be used, or alternatively, a mixture of two or more alkylene glycol monoalkyl ethers may be used.

In a preferred embodiment of the present invention, the maintenance liquid according to the present invention further comprises an acetylene glycol surfactant. The addition of the acetylene glycol surfactant can further improve the cleaning properties of the maintenance liquid. The reason why the cleaning properties can be improved by the addition of the acetylene glycol surfactant has not been elucidated yet. However, without intending to be bound by theory, the reason for the advantageous further improvement in cleaning properties is believed as follows. In the molecule of the acetylene glycol surfactant, the hydrophobic part is clearly separated from the hydrophilic part. Further, the molecular weight of the acetylene glycol surfactant is relatively lower than that of other surfactants. By virtue of the above nature, materials generally used for the internal surface of the ink passage such as SUS are well wetted by the maintenance liquid, and the ink ingredients can be efficiently replaced by the maintenance liquid. Further, the acetylene glycol surfactant is a nonionic surfactant and is especially less likely to foam and has a significant antifoaming tendency. It is considered that, by virtue of this nature, there is no fear of troubles such as missing of dots caused by foams, and efficient cleaning can be realized.

The acetylene glycol surfactant has an additional advantage that, since the acetylene glycol surfactant is highly miscible with the alkylene glycol monoalkyl ether, separation or the like is less likely to occur.

The content of the acetylene glycol surfactant in the maintenance liquid according to the present invention may be properly determined so as to fall within such a content range that can realize the above contemplated effect. The content of the acetylene glycol surfactant, however, is preferably in the range of 0.05 to 5% by weight. The lower limit of the acetylene glycol surfactant content is more preferably 0.1% by weight, and the upper limit of the acetylene glycol surfactant content is more preferably 3% by weight. When the acetylene glycol surfactant content is in the above-defined range, the above contemplated effect can be satisfactorily attained. Further, in this case, the viscosity of the maintenance liquid can be brought to a proper range, and, thus, good fluidity can be ensured in the maintenance liquid.

Specific examples of acetylene glycol surfactants include compounds represented by formulae (1) to (7).

(1)

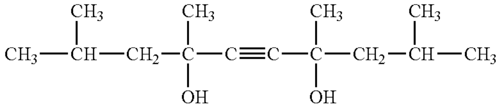

-continued (2)

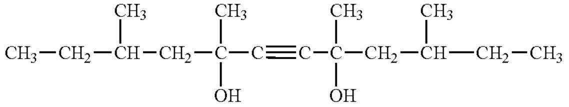

(3)

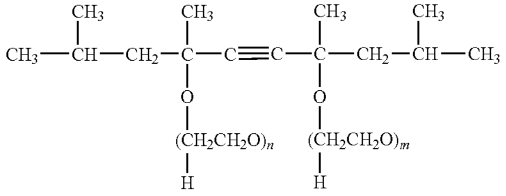

n + m = 1-30

(4)

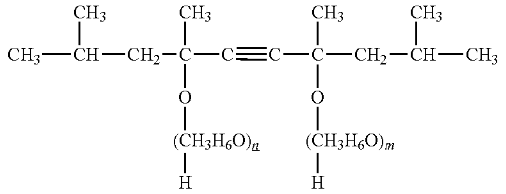

n + m = 1-30

(5)

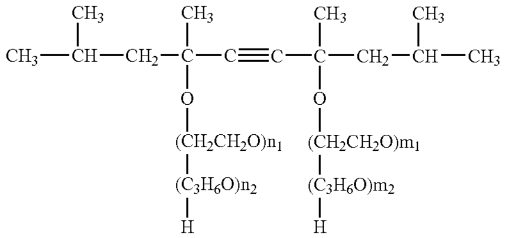

n1 + m1 + n2 + m2 = 1-30

(6)

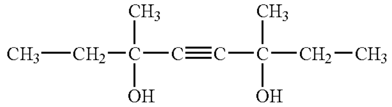

(7)

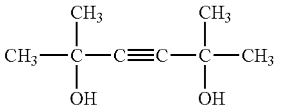

Commercially available acetylene glycol surfactants may also be used. Examples thereof include OLFINE E 1010, OLFINE E 1004, and OLFINE STG (tradenames; manufactured by Nissin Chemical Industry Co., Ltd.), and Surfynol 104, Surfynol 420, Surfynol 485, and Surfynol GA (tradenames; manufactured by Air Products and Chemicals Inc.).

A single acetylene glycol surfactant may be used, or alternatively, a mixture of two or more acetylene glycol surfactants may be used.

In a preferred embodiment of the present invention, the maintenance liquid according to the present invention further comprises one or at least two polyhydric alcohol compounds selected from the group consisting of glycerin and glycol compounds. The polyhydric alcohol compound has a high level of affinity for water and thus can supplement and further improve the cleaning properties of the maintenance liquid. Further, these polyhydric alcohol compounds are low-volatile and have water-retaining effect and thus can prevent the composition of the maintenance liquid from being changed during standing for a long period of time. Therefore, even when the apparatus is halted for a long period of time in such a state that the apparatus is filled with the maintenance liquid, the effect of the maintenance liquid according to the present invention can be maintained.

The content of the polyhydric alcohol compound in the maintenance liquid according to the present invention is not particularly limited. The content of the polyhydric alcohol compound, however, is preferably in the range of 5 to 60% by weight. The lower limit of the polyhydric alcohol compound content is more preferably 10% by weight, and the upper limit of the polyhydric alcohol compound content is more preferably 40% by weight. The polyhydric alcohol compound content in the above-defined range gives the above contemplated effect satisfactorily. Further, in this case, the viscosity of the maintenance liquid can be brought to a proper range, and, thus, good fluidity can be ensured in the maintenance liquid.

Specific examples of polyhydric alcohol compounds include glycerin, diethylene glycol, triethylene glycol, tetraethylene glycol, and dipropylene glycol. A single kind of polyhydric alcohol compound may be used, or alternatively, two or more kinds of polyhydric alcohol compounds may be used as a mixture.

In a preferred embodiment of the present invention, the maintenance liquid according to the present invention further comprises one or at least two kinds of preservative/antimold selected from the group consisting of isothiazolone compounds and oxazolidine compounds. The addition of the preservative/antimold can inhibit the growth of bacteria, mold and the like during a halt of the apparatus for a long period of time, in such a state that the maintenance liquid is filled into the apparatus, and thus can effectively prevent the adverse effect of deposits of bacteria, mold and the like on ejection stability.

The content of the preservative/antimold in the maintenance liquid according to the present invention may be properly determined by taking into consideration, for example, the effect and solubility. Preferably, however, the content of the preservative/antimold is in the range of 50 ppm to 1% by weight. The lower limit of the content of the preservative/antimold is more preferably 100 ppm, and the upper limit of the content of the preservative/antimold is more preferably 0.5% by weight.

Specific examples of preservative/antimold include compounds represented by formulae (8) to (10). These compounds are commercially available, for example, under the tradename designations Proxel XL 2 and Proxel GXL (tradenames; manufactured by Avecia), and Denicide CSA and NS-500W (tradenames; manufactured by Nagase ChemteX Corporation). A single kind of preservative/antimold may be used, or alternatively, two or more kinds of preservative/antimold may be used as a mixture.

(8)

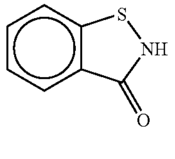

-continued (9)

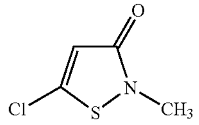

(10)

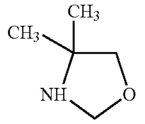

In a preferred embodiment of the present invention, the maintenance liquid according to the present invention has a pH value in the range of 6 to 11 at 25° C. The lower limit of pH is more preferably 7, and the upper limit of pH is more preferably 10. A pH value in the above-defined range is advantageous in that, even when the maintenance liquid is used in an ink jet recording apparatus using an ink containing an anionic compound as a coloring material, satisfactory cleaning properties can be exhibited. Further, in this case, since the reactivity of the maintenance liquid with the material constituting the inside of the ink passage in the ink jet recording apparatus is low, advantageously, there is no fear of causing unfavorable phenomena such as a change in quality of the member, the occurrence of deposits, and unstable ejection.

In order to adjust the pH value of the maintenance liquid according to the present invention to the above-defined range, if necessary, a water-soluble basic material may be used. Such basic materials include hydroxides of alkali metals (for example, sodium hydroxide, potassium hydroxide, and lithium hydroxide), ammonia (water), and various amine compounds. Preferred amine compounds include water-soluble volatile amines and alkanolamines. Specific examples thereof include: volatile amines substituted by an alkyl group having 1 to 3 carbon atoms, for example, methylamine, trimethylamine, diethylamine, and propylamine; alkanolamines, i.e., amines substituted by an alkanol group having 1 to 3 carbon atoms, for example, ethanolamine, diethanolamine, triethanolamine, and triisopropanolamine; and alkylalkanolamines, i.e, amines substituted by an alkyl group having 1 to 3 carbon atoms and an alkanol group having 1 to 3 carbon atoms.

In a preferred embodiment of the present invention, the surface tension at 25° C. of the maintenance liquid according to the present invention is not more than 40 mN/m, more preferably not more than 35 mN/m. When the surface tension of the maintenance liquid is in the above-defined range, since materials generally used for the internal surface of the ink passage such as SUS are well wetted by the maintenance liquid, the ingredients of the ink composition can be efficiently replaced by the maintenance liquid. In order to modify the surface tension to the above-defined range, if necessary, for example, water-soluble organic solvents and surfactants such as 1,2-alkyldiols may be added. Examples of 1,2-alkyldiols include 1,2-octanediol, 1,2-hexanediol, 1,2-pentanediol, and 4-methyl-1,2-pentanediol. Examples of surfactants include, in addition to the above-described acetylene glycol surfactants, conventional anionic surfactants, cationic surfactants, amphoteric surfactants, and nonionic surfactants. Nonionic surfactants are particularly preferred because ink compositions which are less likely to cause foaming or frothing can be provided. Specific examples of nonionic surfactants usable herein include: acetylene alcohol surfactants; ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; ester surfactants, such as polyoxyethyleneoleic acid, polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate; silicon surfactants, such as dimethylpolysiloxane; and fluorosurfactants, such as fluoroalkyl esters and salts of perfluoroalkylcarboxylic acid.

The maintenance liquid according to the present invention exhibits good cleaning properties even in an ink jet recording apparatus using an ink composition containing a pigment as a colorant. Since the pigment is present as particles in the ink, the ink using the pigment is more likely to cause nozzle clogging than an ink containing a dye dissolved therein. In this case, nozzle clogging is likely to occur after a halt of the apparatus for a long period of time. The maintenance liquid according to the present invention can effectively prevent clogging or the like in an ink jet recording apparatus using an ink composition containing a dye as the colorant, as well as in an ink jet recording apparatus using an ink composition containing a pigment as the colorant. Pigments usable in combination with the maintenance liquid according to the present invention include carbon black and Pigment Yellow, Pigment Red, Pigment Violet, Pigment Blue, and Pigment Black which are described in color index. Additional pigments usable herein include phthalocyanine, azo, anthraquinone, azomethine, and fused ring pigments. Further, organic pigments, such as Yellow Nos. 4, 5, 205, and 401, Orange Nos. 228 and 405, Blue Nos. 1 and 404, and inorganic pigments, such as titanium oxide, zinc oxide, zirconium oxide, iron oxide, ultramarine blue, iron blue, and chromium oxide may also be used. Further, in this case, the maintenance liquid according to the present invention may be used in combination with an ink composition containing a pigment which has been stabilized by a dispersant, as well as with an ink composition containing a pigment which could have been self-dispersed by virtue of surface modification.

EXAMPLES

The maintenance liquid for an ink jet recording apparatus according to the present invention will be described in more detail with reference to the following Examples. The present invention, however, is not limited to these Examples only.

Preparation of Maintenance Liquids

Maintenance liquids of Examples 1 to 5 and Comparative Examples 1 to 3 were prepared according to formulations indicated in Table 1. The ingredients were mixed together by thorough stirring, and the mixtures were then filtered under a pressure of 2 kg/cm$^2$ through a membrane filter having a pore diameter of 1 μm to prepare maintenance liquids.

TABLE 1

| No. | Composition of maintenance liquid (wt %) | |
|---|---|---|
| Example 1 | Triethylene glycol mono-n-butyl ether | 2.0% |
| | Glycerin | 30.0% |
| | Ion-exchanged water | 68.0% |
| Example 2 | Diethylene glycol mono-n-butyl ether | 1.0% |
| | OLFINE E 1010 (tradename, manufactured by Nissin Chemical Industry Co., Ltd.) | 1.0% |
| | Triethylene glycol | 30.0% |
| | Ion-exchanged water | 68.0% |

TABLE 1-continued

| No. | Composition of maintenance liquid (wt %) | |
|---|---|---|
| Example 3 | Triethylene glycol mono-n-butyl ether | 5.0% |
| | OLFINE STG (tradename, manufactured by Nissin Chemical Industry Co., Ltd.) | 0.5% |
| | Diethylene glycol | 30.0% |
| | Ion-exchanged water | 64.0% |
| Example 4 | Triethylene glycol mono-n-butyl ether | 1.0% |
| | OLFINE E 1010 (tradename, manufactured by Nissin Chemical Industry Co., Ltd.) | 1.0% |
| | Triethylene glycol | 35.0% |
| | Triethanolamine | 0.5% |
| | Ion-exchanged water | 62.5% |
| Example 5 | Triethylene glycol mono-n-butyl ether | 1.0% |
| | OLFINE E 1010 (tradename, manufactured by Nissin Chemical Industry Co., Ltd.) | 1.0% |
| | Triethylene glycol | 20.0% |
| | Glycerin | 15.0% |
| | Proxel XL 2 (tradename, manufactured by Avecia) | 0.3% |
| | Ion-exchanged water | 62.7% |
| Comparative Example 1 | Glycerin | 30.0% |
| | Proxel XL 2 (tradename, manufactured by Avecia) | 0.3% |
| | Ion-exchanged water | 69.7% |
| Comparative Example 2 | Glycerin | 30.0% |
| | OLFINE E 1010 (tradename, manufactured by Nissin Chemical Industry Co., Ltd.) | 0.5% |
| | Ion-exchanged water | 69.5% |
| Comparative Example 3 | Triethylene glycol | 30.0% |
| | Proxel XL 2 (tradename, manufactured by Avecia) | 0.3% |
| | Ion-exchanged water | 69.7% |

Evaluation 1: Cleaning Properties

Inks using pigments for all colors were filled into PX-V700 (tradename, manufactured by Seiko Epson Corporation), an on-demand ink jet printer, and printing operation was carried out. The inside of an ink passage and a head was then cleaned with 5 cc of the maintenance liquids of Examples 1 to 5 and Comparative Examples 1 to 3. Thereafter, the inside of the ink passage and the head was visually inspected for the amount of the ink remaining unremoved. The results were evaluated according to the following criteria.

A: The ink could be fully removed.

B: The ink could be largely removed with a very small amount of the ink remaining unremoved.

C: A large amount of the ink remaining unremoved was observed.

Evaluation 2: Maintainability

The inks were filled into the ink jet printer PX-V700 used in evaluation 1, and printing operation was carried out. The inside of an ink passage and a head was then cleaned with 5 cc of the maintenance liquids of Examples 1 to 5 and Comparative Examples 1 to 3. Thereafter, in such a state that the maintenance liquid was filled, the printer was allowed to stand under an environment of 60° C. for one week. The periphery of nozzles of the head after standing was observed under a microscope for the level of the adherence of a deposit around nozzles, and the results were evaluated according to the following criteria.

A: There was substantially no adherence of deposit around nozzles.

B: Adherence of a slight amount of deposit around nozzles was observed on such a level that did not cause clogging of the nozzles.

C: Adherence of deposit around nozzles was observed on such a level that caused clogging of the nozzles.

Evaluation 3: Election Stability

The inks were filled into the ink jet printer PX-V700 used in evaluation 1, and printing operation was carried out. The inside of an ink passage and a head was then cleaned with 5 cc of the maintenance liquids of Examples 1 to 5 and Comparative Examples 1 to 3. Thereafter, in such a state that the maintenance liquid was filled, the printer was allowed to stand under an environment of 60° C. for one week. After standing, the printer was returned to room temperature, and the inks were again filled into the printer, followed by continuous printing of blotted images (100% duty). The print was inspected for missing of dots and dot formation directionality problem. The results were evaluated according to the following criteria.

A: Cleaning operation was not necessary for printing free from missing of dots and dot formation directionality problem.

B: Cleaning operation after ink filling was necessary once or twice for printing free from missing of dots and dot formation directionality problem.

C: Cleaning operation after ink filling was necessary three times or more for printing free from missing of dots and dot formation directionality problem.

The results of evaluation for above items were as shown in Table 2 below. Measured values of pH and surface tension of each maintenance liquid are also shown in Table 2.

TABLE 2

| No. | pH | Surface tension (mN/m) | Evaluation 1 Cleaning properties | Evaluation 2 Maintain-ability | Evaluation 3 Ejection stability |
|---|---|---|---|---|---|
| Example 1 | 7.1 | 34 | B | B | B |
| Example 2 | 7.5 | 29 | A | B | B |
| Example 3 | 7.3 | 30 | A | B | B |
| Example 4 | 9.8 | 29 | A | A | A |
| Example 5 | 9.3 | 29 | A | A | A |
| Comparative Example 1 | 7.5 | 56 | C | C | C |
| Comparative Example 2 | 5.8 | 35 | B | C | C |
| Comparative Example 3 | 10.3 | 54 | C | C | C |

The invention claimed is:

1. A maintenance liquid for an ink jet recording apparatus consisting essentially of water, an alkylene glycol monoalkyl ether, and an acetylene glycol surfactant, wherein the alkylene glycol monoalkyl ether is present in the maintenance liquid in an amount of 0.3 to 15% by weight and the acetylene glycol surfactant is present in the maintenance liquid in an amount of 0.05 to 5% by weight, said amounts of the alkylene glycol monoalkyl ether and the acetylene glycol surfactant being such that the maintenance liquid is effective in removal of ink from an ink passage of the ink jet recording apparatus, the amount of the acetylene glycol surfactant being sufficient to improve the removal of ink from the ink passage as compared with the maintenance liquid without the acetylene glycol surfactant, and wherein the maintenance liquid has a surface tension of not more than 40 mN/m at 25°/C.

2. A kit comprising a maintenance liquid for an ink jet recording apparatus consisting essentially of water, an alkylene glycol monoalkyl ether and an acetylene glycol surfactant, in combination with an ink comprising a pigment as a colorant, wherein the alkylene glycol monoalkyl ether is present in the maintenance liquid in an amount of 0.3 to 15% by weight and the acetylene glycol surfactant is present in the maintenance liquid in an amount of 0.05 to 5% by weight, said amounts of the alkylene glycol monoalkyl ether and the acetylene glycol surfactant being such that the maintenance liquid is effective in removal of the ink from an ink passage of the ink jet recording apparatus, the amount of the acetylene glycol surfactant being sufficient to improve the removal of the ink from the ink passage as compared with the maintenance liquid without the acetylene glycol surfactant.

3. In a method for cleaning an ink passage of an ink jet recording apparatus, wherein the ink passage is used in ink jet recording for supplying an ink composition comprising a colorant, the improvement comprising the step of cleaning the ink passage by supplying a maintenance liquid into the ink jet recording apparatus instead of the ink composition, wherein the maintenance liquid comprises water, an alkylene glycol monoalkyl ether and an acetylene glycol surfactant, and wherein the alkylene glycol monoalkyl ether is present in the maintenance liquid in an amount of 0.3 to 15% by weight and the acetylene glycol surfactant is present in the maintenance liquid in amount of 0.05 to 5% by weight, said amounts of the alkylene glycol monoalkyl ether and the acetylene glycol surfactant being such that the maintenance liquid is effective in removal of the ink composition from the ink passage of the ink jet recording apparatus, the amount of the acetylene glycol surfactant being sufficient to improve the removal of the ink composition from the ink passage as compared with the maintenance liquid without the acetylene glycol surfactant.

4. The method according to claim 3, wherein the maintenance liquid comprises one or at least two polyhydric alcohol compounds selected from the group consisting of glycerin and glycol compounds.

5. The method according to claim 4, wherein the maintenance liquid contains 5 to 60% by weight of the polyhydric alcohol compound.

6. The method according to claim 3, wherein the maintenance liquid comprises one or at least two kinds of preservative/antimold selected from the group consisting of isothiazolone compounds and oxazolidine compounds.

7. The method according to claim 6, wherein the maintenance liquid contains 50 ppm to 1% by weight of said preservative/antimold.

8. The method according to claim 3, wherein the maintenance liquid has a pH value in the range of 6 to 11 at 25° C.

9. The method according to claim 3, wherein the maintenance liquid has a surface tension of not more than 40 mN/m at 25° C.

10. The method according to claim 3, comprising supplying an ink comprising a pigment as a colorant through the ink passage and ejecting the ink onto a recording medium for printing.

11. The method according to claim 3, further comprising the step of sucking the maintenance liquid through a recording head of the ink jet recording apparatus.

12. The method according to claim 3, wherein the ink jet recording apparatus is halted from printing.

13. The method according to claim 3, wherein the ink jet recording apparatus into which the maintenance liquid is supplied is left standing for a period of time while filled with the maintenance liquid.

* * * * *